(12) United States Patent
Liu

(10) Patent No.: US 10,440,634 B2
(45) Date of Patent: *Oct. 8, 2019

(54) NETWORK ACCESS METHOD AND MOBILE COMMUNICATIONS TERMINAL

(71) Applicant: GUANGDONG OPPO MOBILE TELECOMMUNICATIONS CORP., LTD., Dongguan, Guangdong (CN)

(72) Inventor: Hai Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/329,380

(22) PCT Filed: Mar. 22, 2016

(86) PCT No.: PCT/CN2016/077014
§ 371 (c)(1),
(2) Date: Jan. 26, 2017

(87) PCT Pub. No.: WO2016/173338
PCT Pub. Date: Nov. 3, 2016

(65) Prior Publication Data
US 2017/0230896 A1 Aug. 10, 2017

(30) Foreign Application Priority Data
Apr. 30, 2015 (CN) .......................... 2015 1 0220531

(51) Int. Cl.
*H04W 48/10* (2009.01)
*H04W 48/14* (2009.01)
(Continued)

(52) U.S. Cl.
CPC ............. *H04W 48/10* (2013.01); *H04W 4/80* (2018.02); *H04W 48/14* (2013.01); *H04W 48/16* (2013.01);
(Continued)

(58) Field of Classification Search
CPC ..... H04W 48/08; H04W 48/10; H04W 48/14; H04W 48/16; H04W 48/18; H04W 8/02; H04W 4/008; H04W 64/00
See application file for complete search history.

(56) References Cited

U.S. PATENT DOCUMENTS 7,920,846 B2   4/2011   Wang
8,135,406 B2   3/2012   Wijayanathan
(Continued)

FOREIGN PATENT DOCUMENTS

CN    1826764 A     8/2006
CN    101483853 A   7/2009
(Continued)

OTHER PUBLICATIONS

International Search Report dated Jun. 22, 2016, corresponding to International Publication No. PCT/CN2016/077014.
(Continued)

*Primary Examiner* — Magdi Elhag

(57) ABSTRACT

Disclosed in the embodiments of the present invention are a network access method and a mobile communications terminal, comprising: first determining the current position of a mobile communications terminal; if the network identifier of the public land mobile network (PLMN) corresponding to said position has not been added to a pre-stored first equivalent public land mobile network (EPLMN) list, then scanning a Bluetooth low energy protocol broadcast channel; when a second EPLMN list published to said Bluetooth low energy protocol broadcast channel is detected by scanning,
(Continued)

obtaining said second EPLMN list; if the network identifier of the PLMN corresponding to said position is added to said second EPLMN list, then lastly, accessing the network according to said second EPLMN list.

6 Claims, 3 Drawing Sheets

(51) Int. Cl.
  *H04W 48/16*   (2009.01)
  *H04W 4/80*   (2018.01)
  *H04W 64/00*   (2009.01)
  *H04W 84/04*   (2009.01)

(52) U.S. Cl.
  CPC .......... *H04W 64/00* (2013.01); *H04W 84/042* (2013.01); *Y02D 70/144* (2018.01); *Y02D 70/164* (2018.01)

(56) References Cited

U.S. PATENT DOCUMENTS

| | | | |
|---|---|---|---|
| 8,774,802 B2 | 7/2014 | Kim | |
| 9,344,877 B1 | 5/2016 | Arugonda et al. | |
| 9,467,845 B1 | 10/2016 | Rastogi et al. | |
| 2005/0153684 A1* | 7/2005 | Rodrigo | H04M 7/00 455/411 |
| 2006/0160537 A1 | 7/2006 | Buckley | |
| 2008/0051031 A1 | 2/2008 | Itoh et al. | |
| 2009/0221283 A1* | 9/2009 | Soliman | H04W 48/14 455/426.1 |
| 2011/0080849 A1 | 4/2011 | Choi | |
| 2012/0064883 A1 | 3/2012 | Kim | |
| 2012/0317448 A1* | 12/2012 | Li | H04L 41/0686 714/57 |
| 2013/0273887 A1 | 10/2013 | Hole | |
| 2014/0235241 A1 | 8/2014 | Sharan et al. | |
| 2015/0056985 A1* | 2/2015 | Swaminathan | H04W 88/06 455/432.1 |
| 2015/0072686 A1 | 3/2015 | Xu et al. | |
| 2015/0088977 A1* | 3/2015 | Monesson | H04L 65/605 709/203 |
| 2015/0141012 A1* | 5/2015 | Ramkumar | H04W 48/20 455/435.3 |
| 2015/0215849 A1* | 7/2015 | Patel | H04W 48/16 455/435.2 |
| 2015/0223279 A1 | 8/2015 | Jiao et al. | |
| 2016/0219501 A1* | 7/2016 | Chang | H04W 48/18 |
| 2017/0208538 A1* | 7/2017 | Cao | H04W 48/18 |
| 2017/0215227 A1* | 7/2017 | Duan | H04W 48/16 |
| 2017/0223621 A1* | 8/2017 | Tan | H04W 48/18 |

FOREIGN PATENT DOCUMENTS

| | | |
|---|---|---|
| CN | 103313328 A | 9/2013 |
| CN | 103379567 A | 10/2013 |
| CN | 103582127 A | 2/2014 |
| CN | 104365147 A | 2/2015 |
| CN | 104968030 A | 10/2015 |
| EP | 2429224 A1 | 3/2012 |
| WO | 2014128641 A1 | 8/2014 |

OTHER PUBLICATIONS

European Search Report issued in corresponding European Patent Application No. 16785769.7, dated Jan. 5, 2018.
USPTO FOA dated Oct. 16, 2018 in connection with U.S. Appl. No. 15/688,206.
USPTO NOA dated Jul. 10, 2019 in connection with U.S. Appl. No. 15/688,206.

* cited by examiner

NETWORK ACCESS METHOD AND MOBILE COMMUNICATIONS TERMINAL

CROSS REFERENCE TO RELATED APPLICATION

This application is a US national phase application based upon an International Application No. PCT/CN2016/077014, filed on Mar. 22, 2016, which claims priority to Chinese Application No. 201510220531.6, filed Apr. 30, 2015. The entire disclosures of each of the above applications are incorporated herein by reference.

BACKGROUND OF THE DISCLOSURE

1. Field of the Disclosure

The present disclosure relates to the field of mobile communication technology, and more particularly, to a method of accessing to networks and a mobile communication terminal.

2. Description of the Related Art

Public land mobile network (PLMN) is a network built and operated by the government or operators approved by the government for the purpose of providing land-bound mobile communication services for the public. The network is usually connected to public switched telephone network (PSTN), forming a communication network that covers a whole region or country.

A network identity of the PLMN is usually just a string of numbers. For example, the network identity of PLMN of China Mobile is 46000, and the network identity of PLMN of China Unicom is 46001. Through the mobile networks provided by each operator, users can enjoy rapid and convenient communication. The number of users carrying communication terminals has been on the rise as people's living standard elevates. When a user inserts a new user identification card into a mobile communication terminal for the first time, the mobile communication terminal (e.g. a cell phone) must search a network to acquire the network identity of the PLMN. However, when the user inserts the new user identification card into the mobile communication terminal for the first time, it usually takes the terminal a long time (sometimes even as long as ten to twenty minutes) to search the network. And, only when the terminal successfully found the network can it connect to the PLMN of the location. It significantly influences users' communication experience.

SUMMARY

The embodiment of the present disclosure provides a method and mobile communication terminal for accessing to a network and reducing the time needed to connect to a PLMN, thus greatly improves users' communication experience.

The present disclosure proposes a method for accessing to a network. The method includes follows.

A location of a mobile communication terminal is determined.

a Bluetooth low energy (BLE) protocol broadcast channel is scanned if a network identity of a public land mobile network (PLMN) corresponding to the location have not been added to a first equivalent public land mobile network (EPLMN) list.

a second EPLMN list is extracted when the second EPLMN list released on the BLE protocol broadcast channel is scanned.

The network is accessed based on the second EPLMN list if the second EPLMN is added with the network identity of the PLMN corresponding to the location.

The present disclosure also proposes a mobile communication terminal. The mobile communication terminal includes a determining unit, a scanning unit, an extracting unit, and an accessing unit.

The determining unit is configured to determine a location of the mobile communication terminal.

The scanning unit is configured to scan a Bluetooth low energy (BLE) protocol broadcast channel if a network identity of PLMN corresponding to the location determined by the determining unit has not been added into a first EPLMN list.

The extracting unit is configured to extract a second EPLMN list if the second EPLMN list released on the BLE protocol broadcast channel is scanned by the scanning unit.

The accessing unit is configured to connect to a network based on the second EPLMN list if the second EPLMN list extracted by the extracting unit is added with the network identity of the PLMN corresponding to the location.

The embodiment of the present disclosure determines a location of the mobile communication terminal. If the network identity of a PLMN corresponding to the location has not been added in a stored first EPLMN list, a Bluetooth low energy (BLE) protocol broadcast channel is scanned. When a second EPLMN list released on the BLE protocol broadcast channel is detected during scanning, the second EPLMN list is extracted. If the network identity of the PLMN corresponding to the location has already been added into the second EPLMN list, the network connection is conducted based on the second EPLMN list. The embodiment of the present disclosure connects to the network based on the second EPLMN list that has already been added with the network identity of the PLMN corresponding to the location. The network identities of PLMNs stored in the second EPLMN list are regarded as equivalent to a certain extent by the mobile communication terminal. Therefore, when the mobile communication terminal connects to a network based on the EPLMN list, which has stored network identities of PLMNs corresponding to the location, it significantly heightens the chance of finding a PLMN whose network identity matches a network identity that is already stored in the EPLMN list during the process of network searching. It also heightens the possibility of the mobile communication terminal accessing to a network at the location. It is instrumental in minimizing the waiting time when users are communicating (ideally, it only takes a few seconds for the mobile communication terminal to complete network connection), and thus is instrumental in greatly improve users' communication experience.

BRIEF DESCRIPTION OF THE DRAWINGS

In order to more clearly illustrate the embodiments of the present disclosure or related art, the following figures will be described in the embodiments are briefly introduced. It is obvious that the drawings are merely some embodiments of the present disclosure, those of ordinary skill in this field can obtain other figures according to these figures without paying the premise.

DETAILED DESCRIPTION OF PREFERRED EMBODIMENTS

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

The embodiment of the present disclosure proposes a method and mobile communication terminal for accessing to a network to reduce the time needed for the mobile communication terminal to connect to a PLMN, thus greatly improves users' communication experience.

Figure 1:
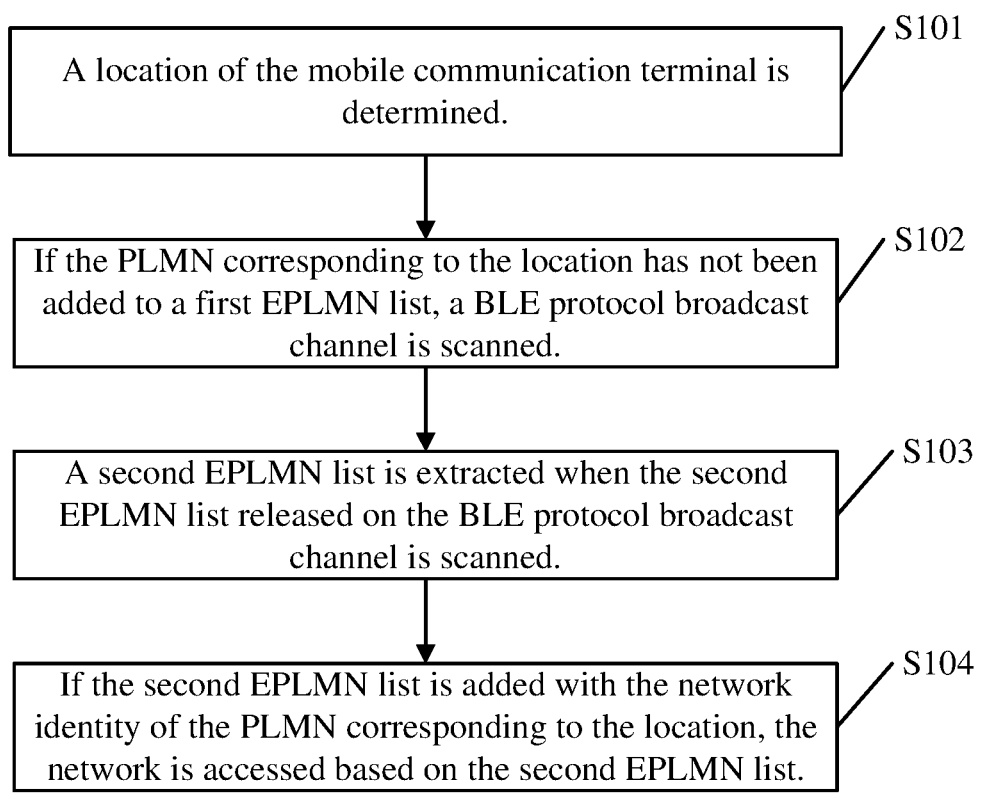
FIG. 1 is a flow chart of the method for accessing to a network according to an embodiment of the present disclosure.

Please refer to FIG. 1. FIG. 1 is a flow chart of the method for accessing to a network according to an embodiment of the present disclosure. It can be applied to mobile communication terminals such as smart phones (e.g. android phones, iOS phones, and so on). The method for accessing to a network includes following blocks:

S101: A location of the mobile communication terminal is determined.

As an optional method for implementation, when the user carrying the mobile communication terminal moves from a home location to a visited location, or from location A to location B, geographical the location data of the user carrying the terminal must be obtained so to extract the network identity of the PLMN corresponding to the visited location when the mobile communication terminal is shifting to another network or reactivated upon arriving the visited location. Extracting the current geographical location of the terminal can be achieved through various means of positioning, such a global positioning system (GPS) embedded in the terminal.

In the embodiment of the present disclosure, the mobile communication terminal can extract the location data based on the location's longitude and latitude, or on an iconic building that sits on the location. For example, if the mobile communication terminal currently locates in Beijing, an iconic building corresponding to the location can be Imperial Palaces.

S102: If the PLMN corresponding to the location has not been added to a first EPLMN list, a BLE protocol broadcast channel is scanned.

In the embodiment of the present disclosure, PLMN is a network built and operated by the government or operators approved by the government for the purpose of providing land-bound mobile communication services to the public. The network is usually connected to PSTN, forming a communication network that covers a whole region or country. For example, the network identity of PLMN of China Mobile is 46000, and the network identity of China Unicom is 46001. PLMN is a wireless communication system, inclined to be accessed by land-bound users riding on transportation tools or moving on foot. Such a system can be independent, but it is usually connected to a landline telephone system, such as PSTN. However, there are also more and more mobile and portable Internet users. An ideal PLMN system provides services to mobile and portable users equivalent to that provides to landline users. It can be especially challenging in areas with complicated terrains, because it is difficult to find and maintain a base station. There are also many obstacles in an urban environment, such as noises and interfering radiation that can be evoked by buildings and radio frequencies.

In the embodiment of the present disclosure, an EPLMN is a PLMN that has the same status and level of priority as the PLMN currently chosen by the user's terminal. The EPLMN mainly solves problems related to user retention and roaming strategy in shared networks and original networks. Operators can deploy equivalent PLMNs so to realize sharing of communication network resources. From a business perspective, the practice realizes sharing of communication network resources among different PLMNs defined by the same operator or PLMNs of different operators.

In the embodiment of the present disclosure, the network identity of the PLMN can include network codes. For example, the network code of China Mobile include: 46000, 46002, 46007, and 46008. The network codes of China Unicorn includes: 46001, 46006 and 46009.

Specifically, when the mobile communication terminal determines the location, it will detect whether the network identity of the PLMN corresponding to the location has been added to the first ELPMN list.

S103: A second EPLMN list is extracted when the second EPLMN list released on the BLE protocol broadcast channel is scanned.

In the embodiment of the present disclosure, when the mobile communication terminal detects that the network identity of the PLMN corresponding to the location has not been added to the first EPLMN list, it activates a BLE scan, which is broadcasting a Bluetooth message through the BLE protocol broadcast channel A scan done by BLE scan technique can lower the power consumed by the mobile communication terminal during the scan.

S104: If the second EPLMN list is added with the network identity of the PLMN corresponding to the location, connect to the network based on the second EPLMN list.

The embodiment of the present disclosure also needs to detect whether the network identity of the PLMN corresponding to the location is added into the second EPLMN list. When the network identity of the PLMN corresponding to the location is added into the second EPLMN list, connect to the network based on the second EPLMN list.

In FIG. 1, the mobile communication terminal first determines the location of the mobile communication terminal. If the network identity of the PLMN corresponding to the location has not been added to the first EPLMN list, the BLE protocol broadcast channel is scanned; when the second EPLMN list released on the BLE protocol broadcast channel is scanned, extract the second EPLMN list. If the network identity of the PLMN corresponding to the location has been added to the second EPLMN list, the last block is to connect to the network based on the second EPLMN list. The embodiment of the present disclosure, when putting into practice, connects the network based on the second EPLMN list in which the network identity of the PLMN corresponding to the location is added. The PLMNs whose network identities have been stored in the second EPLMN list are, to an extent, regarded as equivalent by the mobile communication terminal. Therefore, if the mobile communication terminal connects the network based on the EPLMN list, which has stored the network identity of the PLMN corresponding to the location, the chance of finding a network identity of a PLMN that has already been stored in the EPLMN list when the mobile communication terminal searches a network at the location is greatly elevated. Therefore, the chance of the mobile communication terminal accessing to the network at the location is greatly elevated, which is instrumental in minimizing the waiting time when users are communicating (ideally, it only takes a few seconds for the mobile communication terminal to complete network connection), and thus is instrumental in greatly improve users' communication experience.

Figure 2:
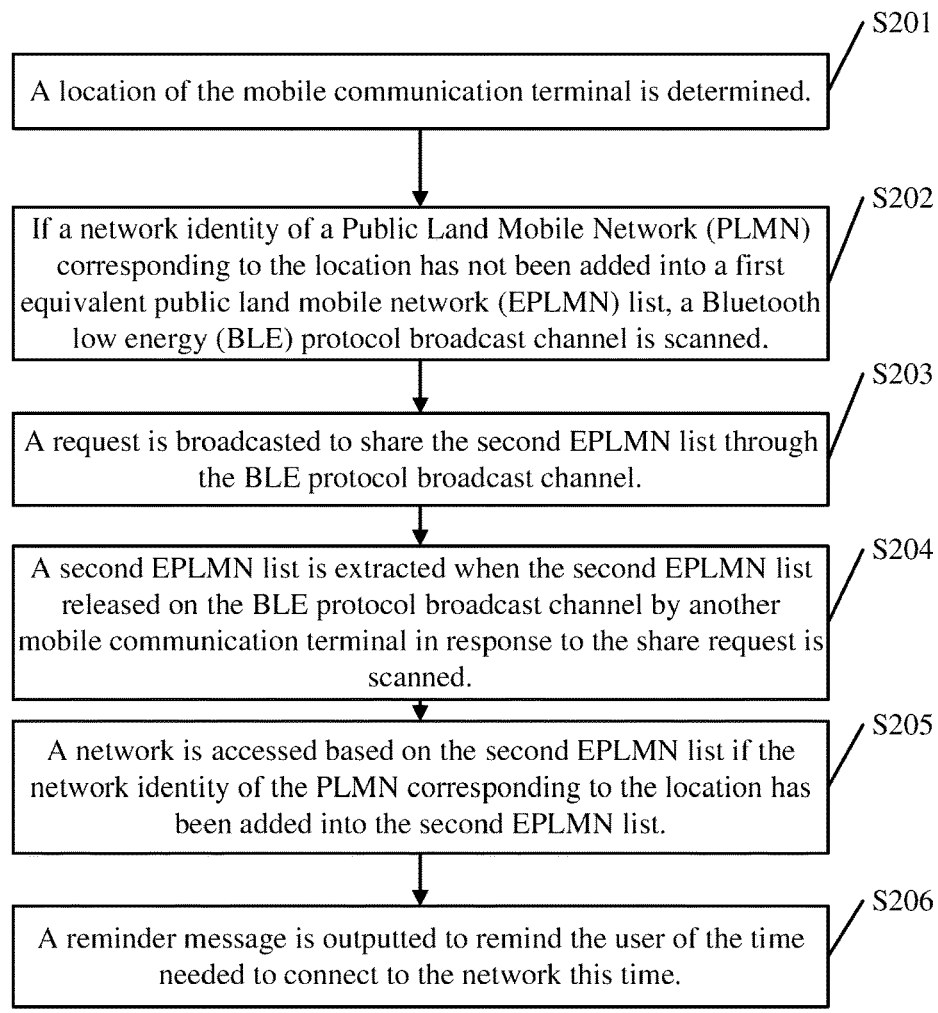
FIG. 2 is a flow chart of the method for accessing to a network according to another embodiment of the present disclosure.

Please refer to FIG. 2. FIG. 2 is a flow chart of the method for accessing to a network according to another embodiment of the present disclosure. The method for accessing to a network includes following blocks:

S201: A location of the mobile communication terminal is determined.

In the embodiment of the present disclosure, the location can be a home location of the user identification card inserted in to the terminal, or a visited location of the user identification card inserted into the terminal.

S202: If a network identity of a Public Land Mobile Network (PLMN) corresponding to the location has not been added into a first equivalent public land mobile network (EPLMN) list, a Bluetooth low energy (BLE) protocol broadcast channel is scanned.

In the embodiment of the present disclosure, PLMN is a network built and operated by the government or operator approved by the government for the purpose of providing land-bound mobile communication services for the public. The network is usually connected to PSTN, forming a communication network that covers a whole region or country. For example, the network identity of PLMN of China Mobile is 46000, and the network identity of China Unicom is 46001. PLMN is a wireless communication system, inclined to be accessed by land-bound users riding on transportation tools or moving on foot. Such a system can be independent, but it is usually connected to a landline telephone system, such as PSTN. However, there are also more and more mobile and portable Internet users. An ideal PLMN system provides services to mobile and portable users equivalent to that provides to landline users. It can be especially challenging in areas with complicated terrains, because it is difficult to find and maintain a base station. There are also many obstacles in an urban environment, such as noises and interfering radiation that can be evoked by buildings and radio frequencies.

In the embodiment of the present disclosure, an EPLMN is a PLMN that has the same status and level of priority as the PLMN currently chosen by the user's terminal. The EPLMN mainly solves problems related to user retention and roaming strategy in shared networks and original networks. Operators can deploy equivalent PLMNs so to realize sharing of communication network resources. From a business perspective, the practice realizes sharing of communication network resources among different PLMNs defined by the same operator or PLMNs of different operators.

S203: A request is broadcasted to share the second EPLMN list through the BLE protocol broadcast channel.

In the embodiment of the present disclosure, a share request can be in text or voice. The present disclosure does not specify any limit on a format of the share request.

S204: A second EPLMN list is extracted when the second EPLMN list released on the BLE protocol broadcast channel by another mobile communication terminal in response to the share request is scanned.

In the embodiment of the present disclosure, when the mobile communication terminal scans a second EPLMN list released on the BLE protocol broadcast channel by another mobile communication terminal in response to the share request, it extracts the second EPLMN list.

S205: A network is connected based on the second EPLMN list if the network identity of the PLMN corresponding to the location has been added into the second EPLMN list.

S206: A reminder message is output to remind users of the time needed to connect to the network.

In the embodiment of the present disclosure, when the mobile communication terminal detects that the network identity of the PLMN corresponding to the location has been added into the second EPLMN list, it connects to the network based on the second EPLMN list. When the connection succeeds, it outputs a reminder message to remind users of the time needed to connect to the network this time. When the connection fails due to some other reasons, the mobile communication terminal detects reasons of this failure and outputs solutions to the user.

FIG. 2 illustrates in detail the procedure of the mobile communication terminal accessing to the network and outputting a reminder message to remind the user of the time needed for the connection this time when the connection succeeds. The embodiment of the present disclosure, when putting into practice, can accurately calculate the time needed for each network connection, and determine the efficiency of the network connection based on the time needed to connect to the network, so to take measures to elevate the efficiency of network connection.

Figure 3:
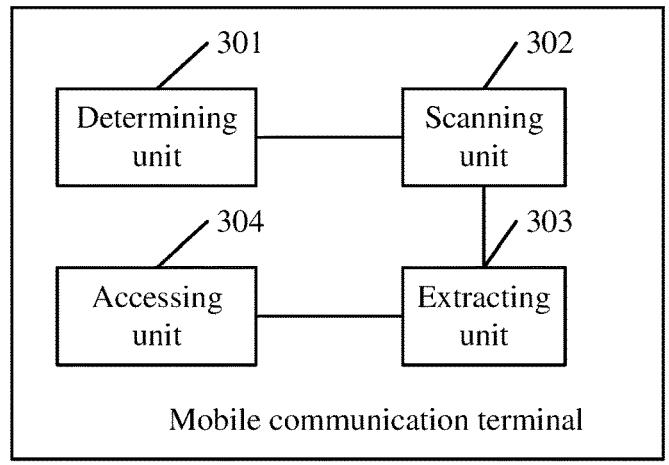
FIG. 3 is a block diagram of a mobile communication terminal according to a first embodiment of the present disclosure.

Please refer to FIG. 3. FIG. 3 is a block diagram of a mobile communication terminal according to a first embodiment of the present disclosure to implement the method for accessing to the network. The mobile communication terminal in FIG. 3 can include but is not limited to terminals that are capable of accessing to networks, such as smart phones (e.g. android phones, iOS phones, and so on), tablets, personal digital assistants (PDA), and mobile internet devices (MID). As shown in FIG. 3, the mobile communication terminal can include a determining unit 301, a scanning unit 302, an extracting unit 303, and an accessing unit 304.

The determining unit 301 is used to determine the location of the mobile communication terminal.

As an optional method for implementation, when the user carrying the mobile communication terminal moves from a home location to a visited location, or from location A to location B, geographical the location data of the user carrying the terminal must be obtained so to extract the network identity of the PLMN corresponding to the visited location when the mobile communication terminal is shifting to another network or reactivated upon arriving the visited location. Extracting the current geographical location of the terminal can be achieved through various means of positioning, such a global positioning system (GPS) embedded in the terminal.

In the embodiment of the present disclosure, the determining unit 301 can determine the location data of the mobile communication terminal based on the location's longitude and latitude, or on an iconic building that sits on the location. For example, if the mobile communication terminal currently locates in Beijing, an iconic building corresponding to the location can be Imperial Palaces.

The scanning unit 302 is used to detect whether the network identity of a PLMN corresponding to the location determined by the determining unit has been added to the first EPLMN list, and is used to scan a Bluetooth low energy (BLE) protocol broadcast channel if a network identity of a public land mobile network (PLMN) corresponding to the location determined by the determining unit has not been added into a first equivalent public land mobile network (EPLMN) list.

In the embodiment of the present disclosure, Public Land Mobile Network (PLMN) is a network built and operated by the government or operators approved by the government for the purpose of providing land-bound mobile communication services to the public. The network is usually connected to PSTN, forming a communication network that covers a whole region or country. For example, the network identity of PLMN of China Mobile is 46000, and the network identity of China Unicom is 46001. PLMN is a wireless communication system, inclined to be accessed by land-bound users riding on transportation tools or moving on foot. Such a system can be independent, but it is usually connected to a landline telephone system, such as PSTN. However, there are also more and more mobile and portable Internet users. An ideal PLMN system provides services to mobile and portable users equivalent to that provides to landline users. It can be especially challenging in areas with complicated terrains, because it is difficult to find and maintain a base station. There are also many obstacles in an urban environment, such as noises and interfering radiation that can be evoked by buildings and radio frequencies.

In the embodiment of the present disclosure, an equivalent public land mobile network (EPLMN) is a PLMN that has the same status and level of priority as the PLMN currently chosen by the user's terminal. The EPLMN mainly solves problems related to user retention and roaming strategy in shared networks and original networks. Operators can deploy equivalent PLMNs so to realize sharing of communication network resources. From a business perspective, the practice realizes sharing of communication network resources among different PLMNs defined by the same operator or PLMNs of different operators.

In the embodiment of the present disclosure, the network identity of the PLMN can include network codes. For example, the network codes of China Mobile include: 46000, 46002, 46007, and 46008. The network codes of China Unicom include: 46001, 46006 and 46009.

Specifically, when the determining unit 301 determines the location, it will detect whether the network identity of the PLMN corresponding to the location has been added to the first ELPMN list.

The extracting unit 303 is used to extract a second EPLMN list when the second EPLMN list released on the BLE protocol broadcast channel is scanned.

In the embodiment of the present disclosure, upon detecting that the network identity of the PLMN corresponding to the location has not been added to the first EPLMN list, the scanning unit 302 activates a BLE scan, which is broadcasting a Bluetooth message through the BLE protocol broadcast channel A scan done by BLE scan technique can lower the power consumed by the mobile communication terminal during the scan.

The accessing unit 304 is used to connect to a network based on the second EPLMN list if the second EPLMN list extracted by the extracting unit is added with the network identity of the PLMN corresponding to the location.

The embodiment of the present disclosure also needs to detect whether the network identity of the PLMN corresponding to the location is added into the second EPLMN list. When the network identity of the PLMN corresponding to the location is added into the second EPLMN list, the accessing unit 304 connects to the network based on the second EPLMN list.

In FIG. 3, the determining unit 301 determines the location of the mobile communication terminal. If the network identity of the PLMN corresponding to the location has not been added to the first EPLMN list, the BLE protocol broadcast channel is scanned by the scanning unit 302; when the second EPLMN list released on the BLE protocol broadcast channel is scanned, the extracting unit 303 extracts the second EPLMN list. If the network identity of the PLMN corresponding to the location has been added to the second EPLMN list, the accessing unit 304 connects to the network based on the second EPLMN list. The embodiment of the present disclosure, when putting into practice, connects the network based on the second EPLMN list in which the network identity of the PLMN corresponding to the location is added. The PLMNs whose network identities have been stored in the second EPLMN list are, to an extent, regarded as equivalent by the mobile communication terminal. Therefore, if the mobile communication terminal connects the network based on the EPLMN list, which has stored the network identity of the PLMN corresponding to the location, the chance of finding a network identity of a PLMN that has already been stored in the EPLMN list when the mobile communication terminal searches a network at the location is greatly elevated. Therefore, the chance of the mobile communication terminal accessing to the network at the location is greatly elevated, which is instrumental in minimizing the waiting time when users are communicating (ideally, it only takes a few seconds for the mobile communication terminal to complete network connection), and thus is instrumental in greatly improve users' communication experience.

Figure 4:
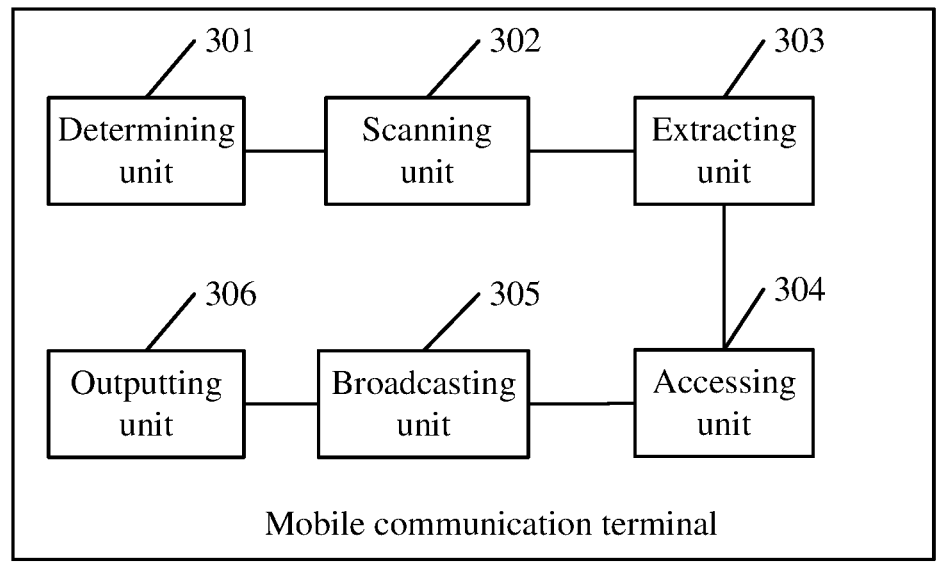
FIG. 4 is a block diagram of a mobile communication terminal according to a second embodiment of the present disclosure.

Please refer to FIG. 4. FIG. 4 is a block diagram of a mobile communication terminal according to a second embodiment of the present disclosure to implement the method for accessing to the network. As shown in FIG. 4, in addition to the units illustrated in FIG. 3, the mobile communication terminal can further include a broadcasting unit 305 and an outputting unit 306.

The broadcasting unit 305 is used to broadcast a request to share the second EPLMN list through the BLE protocol broadcast channel.

In the embodiment of the present disclosure, the extracting unit 303 is used, specifically, to extract a second EPLMN list when the second EPLMN list released on the BLE protocol broadcast channel by another mobile communication terminal in response to the share request is scanned.

In the embodiment of the present disclosure, a share request can be in text or voice. The present disclosure does not specify any limit on a format of the share request.

The outputting unit 306 is used to output a reminder message reminding the user of the time needed to connect to the network this time.

In the embodiment of the present disclosure, when the mobile communication terminal detects that the network identity of the PLMN corresponding to the location has been added into the second EPLMN list, it connects to the network based on the second EPLMN list. When the connection succeeds, it outputs a reminder message to remind users of the time needed to connect to the network this time.

When the connection fails due to some other reasons, the outputting unit 306 detects reasons of this failure and outputs solutions to the user.

FIG. 4 illustrates in detail the procedure of the mobile communication terminal accessing to the network and outputting a reminder message to remind the user of the time needed for the connection this time when the connection succeeds. The embodiment of the present disclosure, when putting into practice, can accurately calculate the time needed for each network connection, and determine the efficiency of the network connection based on the time needed to connect to the network, so to take measures to elevate the efficiency of network connection.

Figure 5:
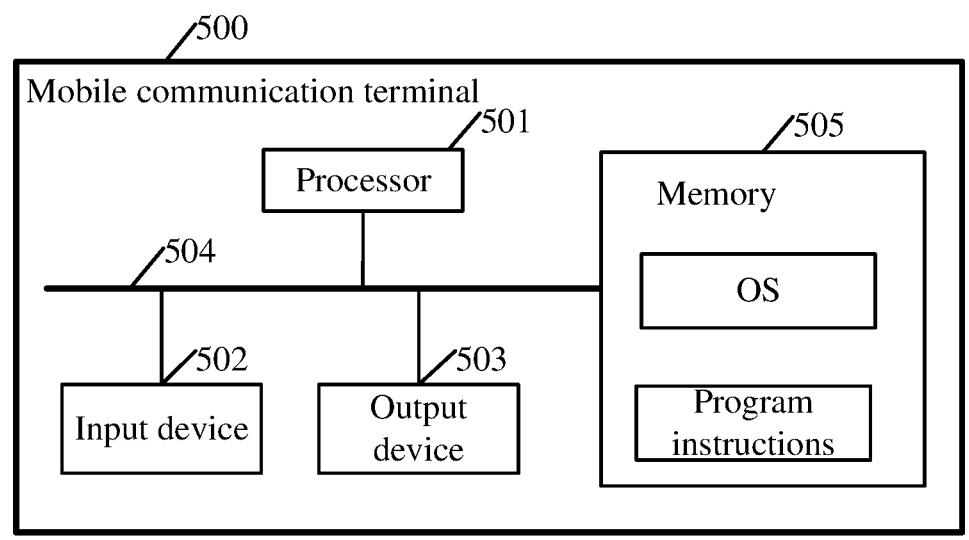
FIG. 5 is a block diagram of a mobile communication terminal according to a third embodiment of the present disclosure.

FIG. 5 is a block diagram of a mobile communication terminal according to a third embodiment of the present disclosure. The mobile communication terminal is configured to perform the above network access methods. A mobile communication terminal 500 may include: elements such as at least one processor 501, at least one input device 502, at least one output device 503, and a memory 505. These elements are communicatively connected through one or a plurality of buses 504. Those of ordinary skill in the art would understand that the embodiment of the present disclosure is not limited to the structure of the mobile communication terminal shown in FIG. 5. It may be either a bus-type structure or a star-type structure, or may include more or fewer elements than illustrated, or some elements may be combined, or the elements may be arranged differently.

The processor 501 is a control center of the mobile communication terminal 500. The processor 501 is connected to various parts of the mobile communication terminal 500 by utilizing various interfaces and circuits. Through running or executing program instructions and/or modules stored in the memory 505, and using data stored in the memory 505, the processor 501 performs a variety of functions of the mobile communication terminal and processes data. The processor 501 may be constituted by an integrated circuit (IC), for example, it may be formed by a single packaged IC, or may be formed by connecting a plurality of packaged ICs having a same function or different functions. For example, the processor 501 may only include a central processing unit (CPU), or may be a combination of a CPU, a digital signal processor (DSP), a graphic processing unit (GPU), and various types of control chips. In the embodiment of the present disclosure, the CPU may be a single-core CPU or may include a multi-core CPU.

The input device 502 includes a standard touch panel, a standard keyboard, etc.

The output device 503 includes a display panel, a speaker, etc.

The memory 505 may be configured to store a software program and the module. The processor 501, the input device 502, and the output device 503 performs a variety of functional applications of the mobile communication terminal and achieve data processing through using the software program and the module stored in the memory 505. The memory 505 mainly includes a program storage area and a data storage area. The program storage area may store an operating system, an application program required by at least one function, or the like. The data storage area may store data or the like created according to uses of the mobile communication terminal. In the embodiment of the present disclosure, the operating system may be an Android system, an iOS system, a Windows operating system, or the like.

Specifically, the processor 501 executes the program instructions stored in the memory 505 to perform the following steps:

determining a location of a mobile communication terminal by using the processor 501 controlling the input device 502;

scanning a Bluetooth low energy (BLE) protocol broadcast channel if a network identity of a public land mobile network (PLMNs) corresponding to the location have not been added to a first equivalent public land mobile network (EPLMN) list;

extracting a second EPLMN list when the second EPLMN list released on the BLE protocol broadcast channel is scanned;

accessing to the network based on the second EPLMN list if the second EPLMN is added with the network identity of the PLMN corresponding to the location.

In the embodiment of the present disclosure, the network identity includes network code.

In the embodiment of the present disclosure, the processor 501 executes the program instructions stored in the memory 505 to perform a following step:

broadcasting a request to share the second EPLMN list on the BLE protocol broadcast channel.

In the embodiment of the present disclosure, when the processor 501 executes the program instructions to extract a second EPLMN list when the second EPLMN list released on the BLE protocol broadcast channel is scanned, the processor 501 executes the program instructions stored in the memory 505 to perform a following step:

extracting the second EPLMN list when the second EPLMN list released on the BLE protocol broadcast channel by another mobile communication terminal in response to the share request is scanned.

In the embodiment of the present disclosure, the processor 501 executes the program instructions to perform a following step:

outputting a reminder message by the output device 503 controlled by the processor 501 to remind the user of a time needed to connect to the network this time.

Specifically, the embodiment of the present disclosure introduces a terminal that can implement part or all of the procedure of the method for accessing to a network introduced by the present disclosure in combined with FIGS. 1 and 2.

All the modules or submodules of the embodiments of the present disclosure can be realized by general integrated circuits, such as central processing unit (CPU) or application specific integrated circuit (ASIC).

The blocks of the embodiments of the present disclosure can be adjusted, combined or deleted based on real needs.

The units of the terminal in the embodiments of the present disclosure can be combined, divided or deleted based on real needs.

An ordinary technician of this field understands that part or all of the procedure of the embodiments can be completed by commanding relevant hardware through computer programs. The program can be stored in a computer readable storage medium. Procedures of the embodiments of the methods can be included when the program is operating. Wherein the storage medium can be a disk, CD, read-only memory (ROM), or random access memory (RAM).

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A method for accessing to a network, comprising:
using a mobile communication terminal having a processor and a memory storing a plurality of program instructions executed by the processor to determine a location of a mobile communication terminal;
   using the processor to execute the plurality of program instructions to scan a Bluetooth low energy (BLE) protocol broadcast channel recorded in the mobile communication terminal if a network identity of a public land mobile network (PLMN) corresponding to the location is not included in a first equivalent public land mobile network (EPLMN) list stored in the memory, wherein the network identity includes network code;
   using the processor to execute the plurality of program instructions to broadcast a request to share a second EPLMN list on the BLE protocol broadcast channel;
   using the processor to execute the plurality of program instructions to extract the second EPLMN list including a plurality of network identities of PLMNs stored in another mobile communication terminal over the BLE protocol broadcast channel, wherein the second EPLMN list is a shared EPLMN list in response to a share request broadcast by the mobile communication terminal;
   using the processor to execute the plurality of program instructions to add the plurality of network identities of PLMNs included in the second EPLMN list to the first PLMN list; and
   using the processor to execute the plurality of program instructions to access to the network based on the second EPLMN list if the second EPLMN is added with the network identity of the PLMN corresponding to the location, wherein the first EPLMN list and the second EPLMN list comprise equivalent PLMNs deployed by different operators, and the equivalent PLMNs stored in the first EPLMN list and the plurality of network identities of PLMNs from the second EPLMN list have a same priority during network searching;
   using the processor to execute the plurality of program instructions to output a reminder message to remind the user, of a time needed to connect to the network.

2. The method of claim 1, wherein the step of using the processor to execute the plurality of program instructions to extract the second EPLMN list including the plurality of network identities of PLMNs stored in another mobile communication terminal over the BLE protocol broadcast channel comprises:
   using the processor to execute the plurality of program instructions to extract the second EPLMN list when the second EPLMN list released on the BLE protocol broadcast channel by another mobile communication terminal in response to the share request is detected.

3. A mobile communication terminal, comprising:
a processor; and
a memory connected with the processor, the memory storing a plurality of program instructions executable by the processor, the plurality of program instructions comprising:
   a determining unit, configured to cause the processor to determine a location of the mobile communication terminal;
   a scanning unit, configured to cause the processor to scan a Bluetooth low energy (BLE) protocol broadcast channel recorded in the mobile communication terminal if a network identity of a public land mobile network (PLMN) corresponding to the location determined by the determining unit is not included in a first equivalent public land mobile network (EPLMN) list stored in the memory, wherein the network identity includes network code;
   a broadcasting unit, configured to cause the processor to broadcast a request to share a second EPLMN list on the BLE protocol broadcast channel;
   an extracting unit, configured to cause the processor to extract the second EPLMN list including a plurality of network identities of PLMNs stored in another mobile communication terminal over the BLE protocol broadcast channel, and add the plurality of network identities of PLMNs included in the second EPLMN list to the first PLMN list, wherein the second EPLMN list is a shared EPLMN list in response to a share request broadcast by the mobile communication terminal; and
   an accessing unit, configured to cause the processor to access to the network based on the second EPLMN list if the second EPLMN is added with the network identity of the PLMN corresponding to the location, wherein the first EPLMN list and the second EPLMN list comprise equivalent PLMNs deployed by different operators, and the equivalent PLMNs stored in the first EPLMN list and the plurality of network identities of PLMNs from the second EPLMN list have a same priority during network searching;
   an outputting unit, configured to cause the processor to output a reminder message to remind the user of a time needed to connect to the network.

4. The mobile communication terminal of claim 3, wherein the extracting unit is configured to cause the processor to extract the second EPLMN list when the second EPLMN released by another mobile communication terminal in response to the request to share the second EPLMN list on the BLE protocol broadcast channel is detected.

5. A mobile communication terminal comprising a processor and a memory configured to store program instructions,
   wherein the processor executes the program instructions to determine a location of a mobile communication terminal; the processor executes the program instructions to scan a Bluetooth low energy (BLE) protocol broadcast channel recorded in the mobile communication terminal if a network identity of a public land mobile network (PLMN) corresponding to the location is not included in a first equivalent public land mobile network (EPLMN) list stored in the memory,
   wherein the network identity comprises a network code; the processor executes the program instructions to broadcast a request to share a second EPLMN list on the BLE protocol broadcast channel; the processor executes the program instructions to extract a second EPLMN list including a plurality of network identities of PLMNs stored in another mobile communication terminal over the BLE protocol broadcast channel,
   wherein the second EPLMN list is a shared EPLMN list in response to a share request broadcast by the mobile communication terminal; the processor executes the program instructions to add the plurality of network identities of PLMNs included in the second EPLMN list to the first PLMN list; the processor executes the program instructions to access to the network based on the second EPLMN list if the second EPLMN is added with the network identity of the PLMN corresponding to the location, wherein the first EPLMN list and the second EPLMN list comprise equivalent PLMNs deployed by different operators, and the equivalent PLMNs stored in the first EPLMN list and the plurality of network identities of PLMNs from the second EPLMN list have a same priority during network searching; the processor executes the program instructions to output a reminder message to remind the user of a time needed to connect to the network.

6. The mobile communication terminal of claim 5, wherein when the processor executes the program instructions to extract a second EPLMN list including a plurality of network identities of PLMNs stored in another mobile communication terminal over the BLE protocol broadcast channel, the processor executes the program instructions to extract the second EPLMN list when the second EPLMN list released on the BLE protocol broadcast channel by another mobile communication terminal in response to the share request is detected.

* * * * *